US007900827B2

(12) United States Patent
Albers et al.

(10) Patent No.: US 7,900,827 B2
(45) Date of Patent: Mar. 8, 2011

(54) TRANSACTION CARD ASSEMBLY WITH SUBJECT AND STAND PORTIONS, ELECTROSTATIC CLINGS AND A BACKER

(75) Inventors: Chad Albers, Minneapolis, MN (US); Ted C. Halbur, Lino Lakes, MN (US); Erin M. Borkowski, Andover, MN (US)

(73) Assignee: Target Brands, Inc., Minneapolis, MN (US)

( * ) Notice: Subject to any disclaimer, the term of this patent is extended or adjusted under 35 U.S.C. 154(b) by 438 days.

(21) Appl. No.: 12/201,335

(22) Filed: Aug. 29, 2008

(65) Prior Publication Data

US 2010/0051705 A1 Mar. 4, 2010

(51) Int. Cl.
*G06K 5/00* (2006.01)

(52) U.S. Cl. ........................................ 235/380; 235/487

(58) Field of Classification Search .................. 235/380, 235/487–495
See application file for complete search history.

(56) References Cited

U.S. PATENT DOCUMENTS

| | | | |
|---|---|---|---|
| 1,330,089 | A | 2/1920 | Plauché |
| 1,347,269 | A | 7/1920 | Greble |
| 1,421,097 | A | 6/1922 | Pente |
| D61,305 | S | 8/1922 | Hopkins |
| 1,866,493 | A | 7/1932 | Staats |
| 2,183,681 | A | 11/1938 | Krout |
| 2,305,195 | A | 12/1942 | Richter |
| D158,255 | S | 4/1950 | Geromanos |
| 2,927,397 | A | 3/1960 | Wilson |
| 2,991,578 | A | 7/1961 | Messina |
| 3,016,644 | A | 1/1962 | Sass |
| 3,392,903 | A | 7/1968 | Morgan, Jr. |
| 3,434,414 | A | 3/1969 | Wright |
| 3,537,195 | A | 11/1970 | Gerds |
| 3,581,708 | A | 6/1971 | Beck |
| 3,583,317 | A | 6/1971 | Gibson |
| D223,164 | S | 3/1972 | Meth et al. |
| D228,075 | S | 8/1973 | Zelenko |
| 4,048,737 | A | 9/1977 | McDermott |
| D264,853 | S | 6/1982 | Scavino et al. |
| 4,510,006 | A | 4/1985 | Lawson |
| 4,689,018 | A | 8/1987 | Trinity |
| 4,778,153 | A | 10/1988 | Bachman et al. |
| 4,911,670 | A | 3/1990 | McNicholas et al. |
| 4,978,146 | A | 12/1990 | Warther et al. |

(Continued)

OTHER PUBLICATIONS

“Book Sense Announces a Lower Minimum for Gift Cards,” news. bookweb.org/graphics/podbtw/20031120.pdf, Nov. 20, 2003.

(Continued)

*Primary Examiner* — Michael G Lee
*Assistant Examiner* — Kristy A Haupt
(74) *Attorney, Agent, or Firm* — Griffiths & Seaton PLLC

(57) ABSTRACT

A transaction product includes a subject portion defining a first slot, a stand portion defining a second slot having a similar width as the first slot, and an account identifier. The stand portion is coupled to the subject portion along a line of weakness and is readily separable from the subject portion along the line of weakness without using tools. The account identifier is fixedly connected to one of the subject portion and the stand portion and links that portion to at least one of an account and a record. When separated, the subject portion and the stand portion are configured to be reassembled such that the first slot receives a thickness of the stand portion and the second slot receives a thickness of the subject portion. Stored-value cards, combinations, methods of facilitating use of a transaction product and other embodiments are also disclosed.

26 Claims, 10 Drawing Sheets

U.S. PATENT DOCUMENTS

| | | | |
|---|---|---|---|
| 5,102,171 | A | 4/1992 | Saetre |
| 5,133,496 | A | 7/1992 | Davidson et al. |
| 5,249,670 | A | 10/1993 | Simon |
| 5,262,215 | A | 11/1993 | Shields |
| 5,269,691 | A | 12/1993 | Waldman |
| 5,326,964 | A | 7/1994 | Risser |
| 5,535,536 | A | 7/1996 | Comann |
| 5,570,081 | A | 10/1996 | Holstrom |
| 5,640,447 | A | 6/1997 | Fonseca |
| 5,667,248 | A | 9/1997 | Mayer |
| 5,677,524 | A | 10/1997 | Haghiri-Tehrani |
| 5,720,158 | A | 2/1998 | Goade, Sr. |
| 5,740,957 | A | 4/1998 | Wenkman |
| 5,777,305 | A | 7/1998 | Smith et al. |
| 5,779,516 | A | 7/1998 | Thorne |
| 5,818,030 | A | 10/1998 | Reyes |
| 5,829,790 | A | 11/1998 | Phillips |
| 5,914,158 | A | 6/1999 | McGuiness |
| 5,921,584 | A | 7/1999 | Goade, Sr. |
| 6,006,988 | A | 12/1999 | Behrmann et al. |
| 6,244,108 | B1 | 6/2001 | McInnes et al. |
| D454,910 | S | 3/2002 | Smith et al. |
| 6,361,045 | B1 | 3/2002 | Bernstein |
| 6,413,603 | B1 | 7/2002 | Horton et al. |
| 6,439,613 | B2 | 8/2002 | Klure |
| 6,439,953 | B1 | 8/2002 | Liu |
| 6,475,054 | B1 | 11/2002 | Liu |
| 6,481,125 | B1 | 11/2002 | Pokrasoff |
| 6,493,970 | B1 | 12/2002 | McCarthy et al. |
| 6,502,748 | B2 | 1/2003 | Berg et al. |
| 6,520,542 | B2 | 2/2003 | Thompson et al. |
| 6,520,543 | B1 | 2/2003 | Hoar |
| 6,543,809 | B1 | 4/2003 | Kistner et al. |
| 6,575,803 | B1 | 6/2003 | Liu |
| 6,588,591 | B1 | 7/2003 | Schabert et al. |
| 6,588,658 | B1 | 7/2003 | Blank |
| 6,589,624 | B1 | 7/2003 | Lee |
| 6,626,732 | B1 | 9/2003 | Chung |
| 6,643,962 | B1 | 11/2003 | Panec et al. |
| 6,647,693 | B2 | 11/2003 | Bromberg |
| 6,666,332 | B1 | 12/2003 | DeWolf et al. |
| 6,666,378 | B2 | 12/2003 | Dávila et al. |
| 6,682,099 | B1 | 1/2004 | Laurash et al. |
| 6,715,795 | B2 | 4/2004 | Klure |
| D493,492 | S | 7/2004 | Best et al. |
| D493,840 | S | 8/2004 | Best et al. |
| D498,788 | S | 11/2004 | Lubking |
| D501,875 | S | 2/2005 | Dean |
| D504,159 | S | 4/2005 | Best et al. |
| 6,877,263 | B2 | 4/2005 | Clark |
| D510,102 | S | 9/2005 | Gray |
| D511,543 | S | 11/2005 | Lubking |
| 6,971,524 | B1 | 12/2005 | Voswinkel |
| 6,974,159 | B2 | 12/2005 | Thompson et al. |
| 7,032,817 | B2 | 4/2006 | Blank |
| 7,065,195 | B1 | 6/2006 | Smith et al. |
| D524,858 | S | 7/2006 | Graves et al. |
| D533,220 | S | 12/2006 | Graves et al. |
| 7,204,048 | B2 | 4/2007 | Kershner et al. |
| 7,219,829 | B2 | 5/2007 | Treat |
| 7,252,197 | B1 | 8/2007 | Voswinkel |
| 7,270,329 | B2 | 9/2007 | Barthold |
| 7,314,179 | B1 | 1/2008 | Halbur et al. |
| 7,316,343 | B2 | 1/2008 | Leifeld et al. |
| D561,252 | S | 2/2008 | Phillips et al. |
| 7,374,095 | B2 | 5/2008 | Blank et al. |
| 7,409,788 | B2 | 8/2008 | Lauer et al. |
| 2002/0019776 | A1 | 2/2002 | Simpson |
| 2002/0100797 | A1 | 8/2002 | Hollingsworth et al. |
| 2002/0143697 | A1 | 10/2002 | Gotfried |
| 2003/0024970 | A1 | 2/2003 | Lonergan |
| 2004/0249748 | A1 | 12/2004 | Schultz et al. |
| 2005/0055858 | A1 | 3/2005 | Lee |
| 2005/0204600 | A1 | 9/2005 | Lauer et al. |
| 2005/0230460 | A1 | 10/2005 | Ristau |
| 2005/0277358 | A1 | 12/2005 | Isenberg |
| 2006/0036492 | A1 | 2/2006 | Becker |
| 2006/0080539 | A1 | 4/2006 | Asami et al. |
| 2006/0118639 | A1 | 6/2006 | Kean et al. |
| 2006/0151348 | A1 | 7/2006 | Willard |
| 2006/0246984 | A1 | 11/2006 | Walker et al. |
| 2006/0261547 | A1 | 11/2006 | Uzuanis |
| 2007/0044356 | A1 | 3/2007 | Riordan et al. |
| 2007/0242595 | A1 | 10/2007 | DiCosola |
| 2007/0272591 | A1 | 11/2007 | Voswinkel |

OTHER PUBLICATIONS

"The Perfect Gift Card Box—BoxyWrap®", http://www.boxywrap.com, available online at least as early as Mar. 8, 2008.

"Instant-Issue Cards," http://www.tbcardworks.com/products/html, available online at least as early as Jul. 19, 2007 per the Internet archive available at www.archive.org.

Photograph of JCPenney Snowman with Stickers Gift Card Assembly, publicly offered for sale in JCPenney retail stores at least as early as Dec. 20, 2007.

Photograph of Kmart Snowman GiftCard with Stickers, publicly offered for sale in Kmart retail stores at least as early as Dec. 2007.

"Loyalty Cards," http://www.tbcardworks.com/loyaltycards.html, available online at least as early as Jul. 19, 2007 per the Internet archive available at www.archive.org.

"Miss Weather Dress-Up Set," http://www.amazon.com/University-Games-72503-Weather-Dress-Up/dp/B00000J05S/ref=pd_sim_t_title_1, available online at least as early as Jan. 7, 2008.

"Sesame Street Colorforms," http://muppet.wikia.com/wiki/Colorforms_Sesame_Street_sets, printed Jun. 6, 2008 (individual years that the pictured products were publicly available are listed in the reference).

"Peelers," http://www.peelersprinting.com, printed on Feb. 13, 2006.

"Retailers Discovering Benefits of Gift Cards," http://www.retailers.com/news/retailers/03may/mr0503giftcards.html, publicly available May 2003.

"Rocketmen: Axis of Evil Releases!," http://www.wizkidsgames.com/rocketmen/article.asp?cid=401469, Aug. 17, 2005.

Goddard, Kevin, "Rocketmen Axis of Evil—The Basics of Rocketmen Part 1: Ships and Resources," http://www.wizkidsgames.com/rocketmen/article.asp?cid=39935, available at least as early as Nov. 11, 2005, per the Internet Archive available at www.archive.org.

Photograph of Sears Sticker Gift Card Assembly, publicly offered for sale in Sears retail stores at least as early as Dec. 20, 2007.

"Using a Sephora Gift Card," http://www.sephora.com/customer_service/csr_controller.jhtml?csrSection=ordering&csrSub=orderGiftCard, printed Jun. 30, 2008.

Toys "R" Us, Colorforms Games Silly Faces, http://www.amazon.com, printed on May 23, 2006.

"Transaction Card with Stake," U.S. Appl. No. 11/697,276, as filed with the United States Patent and Trademark Office on Apr. 5, 2007.

"Transaction Product with Separable Pieces," U.S. Appl. No. 11/779,360, as filed with the United States Patent and Trademark Office on Jul. 18, 2007.

Wade, Will, "First Data Sees Sticker Device as Mobile-Pay Bridge," American Banker, Aug. 25, 2008, 2 pages.

"Contactless Payments: Consumer Trends and Usage Preferences," firstdata.com, 2008, 2 pages.

"Payment Processing: Mobile Commerce and the M-Wallet: A Market Brief," Retail Solutions Online, May 10, 2007, 2 pages.

TRANSACTION CARD ASSEMBLY WITH SUBJECT AND STAND PORTIONS, ELECTROSTATIC CLINGS AND A BACKER

BACKGROUND OF THE INVENTION

Stored-value cards and other transaction products come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction products provide a number of advantages to both the consumer and the retailer.

SUMMARY OF THE INVENTION

One aspect of the present invention relates to a transaction product including a subject portion defining a first slot, a stand portion defining a second slot having a similar width as the first slot, and an account identifier. The stand portion is coupled to the subject portion along a line of weakness and is readily separable from the subject portion along the line of weakness without using tools. The account identifier is fixedly connected to one of the subject portion and the stand portion and links the one of the subject portion and the stand portion to at least one of an account and a record. The account identifier is machine readable by a point-of-sale terminal. When the subject portion and the stand portion are separated from one another along the line of weakness, the subject portion and the stand portion are configured to be reassembled by turning one portion substantially 90° with respect to the other portion and sliding the two portions toward one another such that the first slot receives a thickness of the stand portion and the second slot receives a thickness of the subject portion. Stored-value cards, methods of providing a stored-value card and other embodiments of stored-value or transaction cards and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

Figure 1:
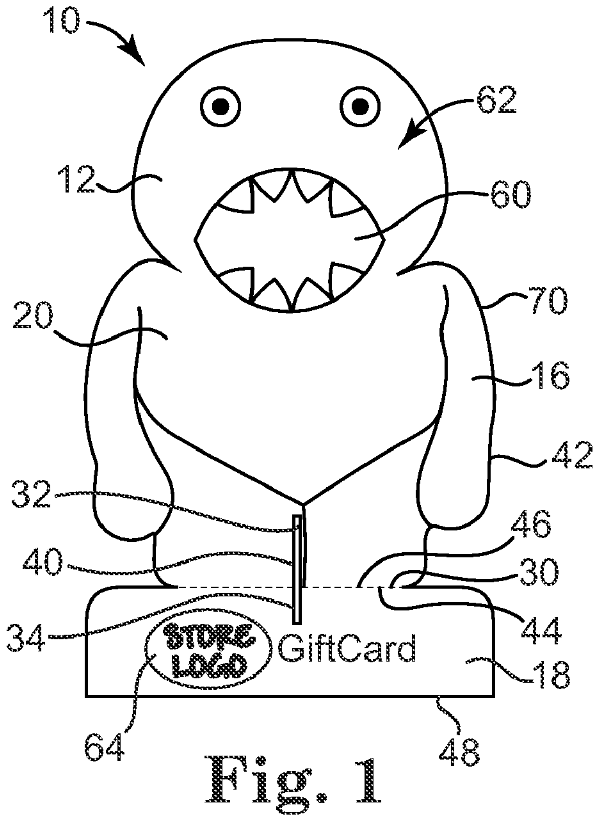
FIG. 1 is a front view illustration of a transaction card, according to one embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

A stored-value card or transaction product, such as a gift card, is adapted for making purchases of goods and/or services at, for example, a retail store or web site. According to one embodiment, an original consumer buys a transaction card to give a recipient who in turn is able to use it to pay for goods and/or services. According to embodiments of the present invention, an assembly including the transaction card provides the consumer and/or recipient with at least two readily separable pieces or portions configured to be reassembled with one another to define an object configured to stand or extend upward from a generally horizontal support surface such as a table, desk, floor, etc.

In one example, in addition to the transaction card, the transaction card assembly provides a user with a plurality of statically charged members. Each statically charged member is configured to be selectively applied to and removed from the transaction card to change the appearance of the transaction card in a manner generally amusing the bearer of the transaction card. In one embodiment, the transaction card depicts a character, which may be fictional or non-fictional, and the statically charged members each depict an item of clothing or other wearable item sized to correspond with the size of the character depicted by the transaction card. As such, the statically charged members can be placed on the transaction card in such a manner that the statically charged members appear as clothing, costume members, etc. on the character. In this manner, the transaction card not only serves as a financial transaction product, but also serves as a doll or figurine that can be dressed, etc. by the bearer of the transaction card. The dual functionality of the transaction card increases the appeal of the card to the initial consumers purchasing the card from a retail store, etc. and to end recipient consumers who receive the card from the initial consumers.

Turning to the figures, FIGS. 1-4 illustrate various views of one embodiment of a subject stored-value, financial, or other transaction card 10 formed of a substrate 12 having an activation area or account identifier 14 (FIG. 2) and defining a first or subject portion 16 and a second or stand portion 18. Account identifier 14 configures transaction card 10 for use as payment toward a purchase of goods and/or services. The stand portion 18 is readily configured to be separated from and reassembled with the subject portion 16 to form a character or other object configured to stand on (e.g., extend vertically from) a support surface to amuse a bearer of transaction card 10.

Substrate 12 is any suitable material such as a somewhat rigid yet flexible material similar to that commonly used for identification cards, credit cards, etc. More specifically, in one embodiment, substrate 12 is a substantially planar member formed of paper, cardstock, plastic (e.g., polycarbonate, polystyrene, polyvinyl chloride (PVC), acrylonitrile butadiene styrene (ABS), polyethylene terephthalate (PET), teslin, polyactide (PLA) and acrylic) or other suitable material. In one embodiment, substrate 12 is formed of injection molded plastic or cut from sheet-stock plastic material. Substrate 12 can be formed in any other suitable planar or non-planar configuration as will be apparent to those of skill in the art upon reading this application.

In one embodiment, subject portion 16 defines a first surface 20 (i.e., a first major surface) and a second surface 22 (i.e., a second major surface) opposite first surface 20 separated by a thickness of substrate 12. In one embodiment, at least one of first surface 20 and second surface 22 is substantially planar. In one example, one or both of surfaces 20 and 22 are polish laminated or otherwise treated to more readily receive statically charged members as will be further described below.

In one embodiment, account identifier 14 (FIG. 3) is included on at least one of first surface 20 and second surface 22 and includes one or more of a bar code, a magnetic strip, a smart chip or other electronic device, a radio frequency identification (RFID) device, or other suitable identifier readily machine readable by a point-of-sale terminal, account access station, kiosk or other suitable device. In one embodiment where account identifier 14 is machine readable, account identifier 14 is also readable by a bearer of transaction card 10 such that transaction card 10 can be used when a machine configured to read transaction card 10 is not present (e.g., when using transaction card 10 to make a purchase on a web site). For example, account identifier 14 may include a number or letter string or a personal identification number (PIN) identifying the associated account or record and/or a password (not illustrated) associated therewith. In one embodiment, account identifier 14 is printed on or otherwise applied or fixedly connected to one of subject portion 16 and stand portion 18, for example, to second surface 22 of subject portion 16.

Account identifier 14 indicates and, therefore, links transaction card 10 to, a financial or other stored-value account or record. The account or record indicates a value or balance (e.g., monetary value, points, minutes or other balance) associated with transaction card 10 and optionally is maintained on a database, other electronic or manual record-keeping system, or, in the case of "smart cards" for example, on a chip or other electronic device on/in transaction card 10 itself. Accordingly, by scanning account identifier 14, the account or record linked to transaction card 10 is identified and can subsequently be activated, have amounts debited therefrom and/or have amounts credited thereto. Account identifier 14 is one example of means for linking transaction card 10 with an account or record.

Figure 2:
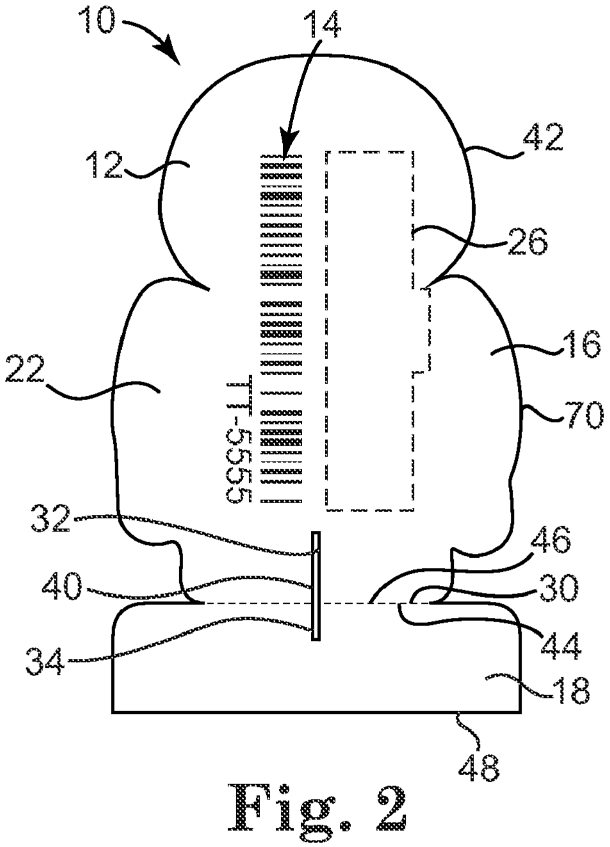
FIG. 2 is a rear view illustration of the transaction card of FIG. 1, according to one embodiment of the present invention.

In one embodiment, redemption indicia 26, which are generally indicated by a broken line box in FIG. 2, are included on transaction card 10 such as on second surface 22 of substrate 12. Redemption indicia 26 indicate that transaction card 10 is redeemable for the purchase of goods and/or services and that, upon use, a value of the purchased goods and/or services will be deducted from the account or record linked to transaction card 10. In one embodiment, redemption indicia 26 include phrases such as "<NAME OF STORE> GiftCard" and "This GiftCard is redeemable for merchandise or services at any of our stores or at our web site," and/or provides help or phone line information in the case of a lost, stolen or damaged stored-value card, etc.

Substrate 12, which, in one example, is formed of a single piece of material, defines subject portion 16 and stand portion 18. In one embodiment, substrate 12 only defines subject portion 16 and stand portion 18 and there is no other portion of transaction card 10. In one embodiment, subject portion 16 and stand portion 18 are only two of three or more portions of transaction card 10 defined by substrate 12. Subject portion 16 and stand portion 18 are initially secured to, but configured to be readily separated from one another. In one example, subject portion 16 and stand portion 18 are coplanarly positioned with respect to one another prior to their separation from one another.

In one embodiment, subject portion 16 and stand portion 18 are positioned on opposite sides of, and in one example, each directly abut, a line of weakness 30 (e.g., a score line, perforation line, narrowing or partial cut). In one example, line of weakness 30 is substantially linear. Line of weakness 30 facilitates separating subject portion 16 and stand portion 18 without the use of tools. For example, by applying a small amount of pressure to each of subject portion 16 and stand portion 18, substrate 12 can be snapped or otherwise broken along line of weakness 30 to separate subject portion 16 and stand portion 18 from one another (i.e., broken into separate pieces). In view of the above, scoring of substrate 12 or otherwise forming line of weakness 30 is an example of means for defining and/or separating subject portion 16 and stand portion 18.

In one embodiment, subject portion 16 and stand portion 18 each define an elongated slot 32 and 34, respectively, which extends from line of weakness 30 into an internal portion of the respective subject portion 16 or stand portion 18. For example, slot 32 and slot 34 extend from line of weakness 30 in opposite directions. In one embodiment, slot 32 and slot 34 align with and abut one another such that slot 32 and slot 34 collectively define a larger slot or narrow opening 40 (FIGS. 1 and 2) in an internal section of substrate 12 (i.e., spaced from an outermost perimeter 42 of substrate 12).

For example, slot 32 extends from a lower edge 44 of subject portion 16, which borders line of weakness 30, away from line of weakness 30. In one example, slot 34 extends from an upper edge 46 of stand portion 18, which is opposite and parallel a lower edge 48 of stand portion 18 and borders line of weakness 30, away from line of weakness 30. Each slot 32 and 34 is configured to facilitate assembly of subject portion 16 and stand portion 18. In one embodiment, each slot 32 and 34 has a similar width substantially equal to a thickness of substrate 12. In one example, slots 32 and 34 are laterally centered across a front of substrate 12.

Figure 3:
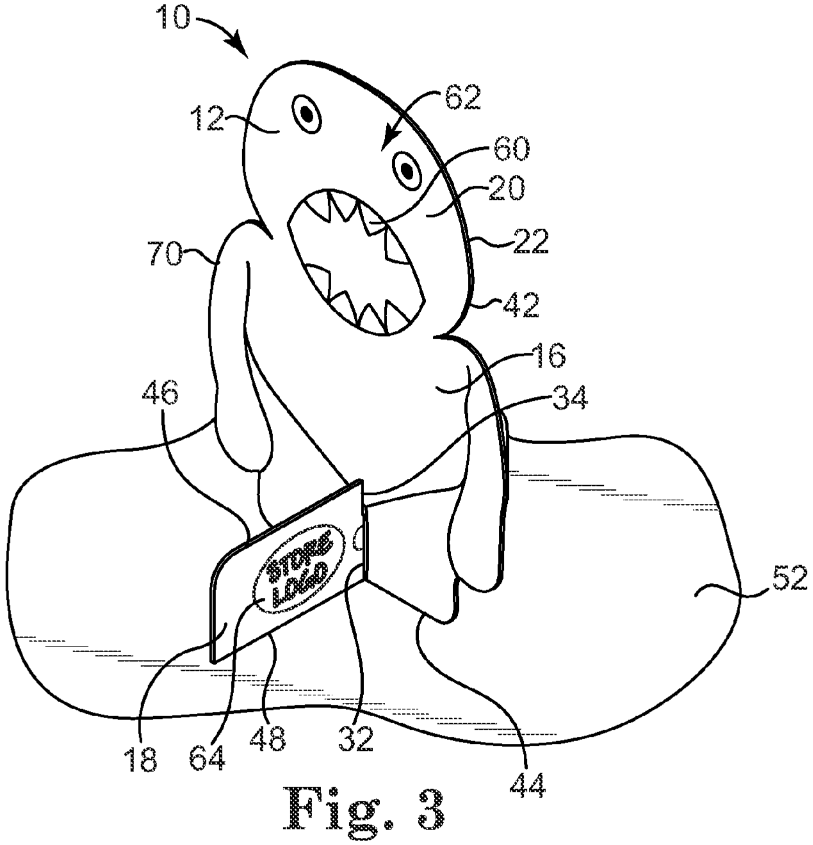
FIG. 3 is a perspective view illustration of the transaction card of FIG. 1 upwardly extending from a support surface, according to one embodiment of the present invention.
Figure 4:
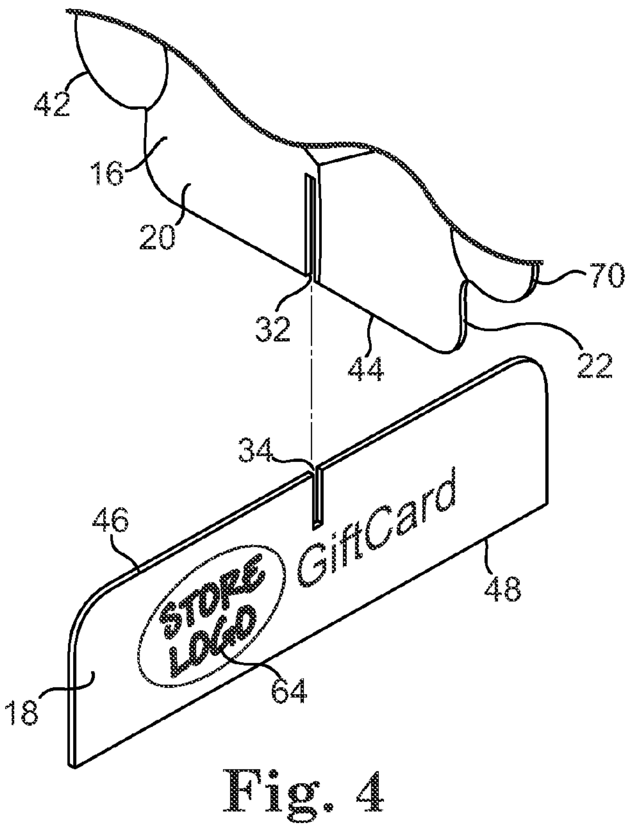
FIG. 4 is a detailed perspective view illustration of a portion of the transaction card of FIG. 1, according to one embodiment of the present invention.

In one embodiment, following separation of subject portion 16 and stand portion 18 along line of weakness 30, subject portion 16 and stand portion 18 are configured to be selectively assembled with one another such that the reconfigured transaction card 10 stands on, i.e., extends upwardly from, a separate support surface 52 (FIG. 3). More specifically, following separation of subject portion 16 and stand portion 18 from one another, one or both of subject portion 16 and stand portion 18 is rotated such that subject portion 16 and stand portion 18 are positioned to be substantially perpendicular to one another (e.g., one of subject portion 16 and stand portion 18 is rotated about 90°, while the other of subject portion 16 and stand portion 18 remains in a substantially static position) as illustrated with reference to FIG. 4.

While subject portion 16 and stand portion 18 are positioned substantially perpendicular to one another, slots 32 and 34 are aligned and subject portion 16 and stand portion 18 are moved toward one another. As such, slots 32 and 34 move through one another to each receive a part of the other of subject portion 16 and stand portion 18. Since slots 32 and 34 are laterally centered on substrate 12, when reassembled, stand portion 18 partially extends in front of and behind subject portion 16 (i.e., a stand portion 18 is positioned to partially extend from each of first surface 20 and second surface 22 of subject portion 16). Once reassembled with one another, lower edge 44 of subject portion 16 and lower edge 48 of stand portion 18 are directly adjacent and positioned in a common plane with one another. Once assembled, lower edge 44 and lower edge 48 are placed on support surface 52 such that at least subject portion 16 extends upward from support surface 52.

In one embodiment, subject portion 16 is shaped and/or includes graphics 60 or other indicia to define a subject 62 such as a character (fictional or non-fictional), or other object (e.g., an automobile). For example, as illustrated in FIGS. 1-3, first surface 20 of subject portion 16 includes graphic 60 such as nose, eye, mouth, arm, leg and body demarcations to further define a character subject 62.

Additional indicia may also be included on subject portion 16 and stand portion 18 of substrate 12 for decorative or other purposes. In one example, additional indicia include any suitable graphics, text or combinations thereof. In one embodiment, additional indicia include one or more brand identifier 64. Brand identifier 64 includes one or more of a logo, text, trademark, etc. that associate transaction card 10 with at least one of a product, a brand, a store, etc. Other indicia may also be included on transaction card 10 as will be apparent to those of skill in the art upon reading this application. In one example, any one or more of indicia 26, 60, 64, etc. may not be included on transaction card 10.

Figure 5:
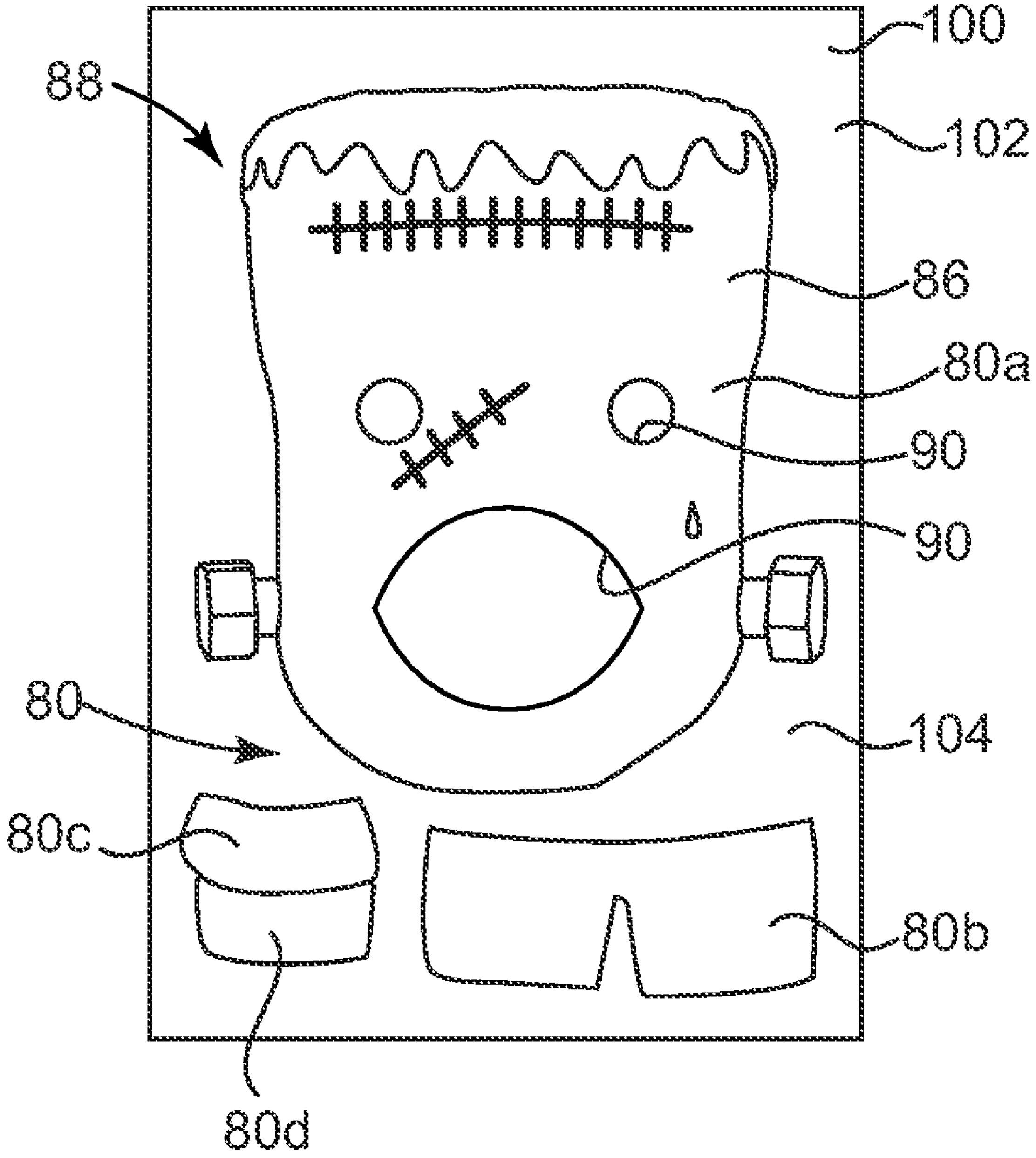
FIG. 5 is a front view illustration of statically charged clings on a support sheet, according to one embodiment of the present invention.
Figure 6:
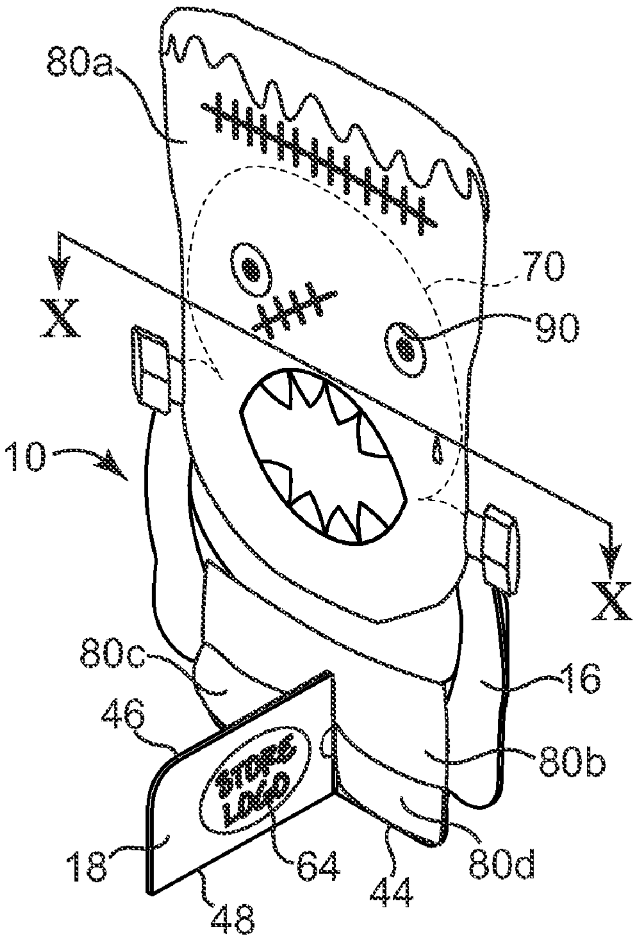
FIG. 6 a perspective view illustration of the transaction card and the support surface of FIG. 3 with the statically charged clings of FIG. 5, according to one embodiment of the present invention.
Figure 7:
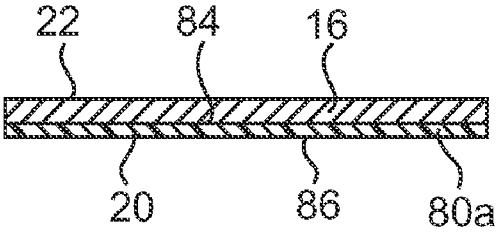
FIG. 7 is a cross-sectional view taken along the line X-X in FIG. 6, according to one embodiment of the present invention.

Additionally referring to FIGS. 5-7, in one embodiment, transaction card 10 is configured for use with clings 80, i.e., members configured to be selectively and repeatedly applied to and removed from at least one of first surface 20 and second surface 22 of subject portion 16 and/or stand portion 18. In one example, clings 80 are statically charged members. More specifically, clings 80 are formed from an electrostatically charged, film or other relatively thin sheet of material, for example, polyvinyl chloride (PVC), polypropylene, polyolefin electret, polylactic acid (PLA). In one embodiment, clings 80 are formed with a thickness less than about 0.25 mm, for example, less than or equal to about 0.15 mm. Alternatively clings 80 may be formed of any other suitable material configured to selectively "stick" or be readily releasably adhered to subject portion 16. Although primarily described as a plurality of clings 80, in one embodiment, only one cling 80 is included for use with transaction card 10.

Each cling 80 defines a first surface 84 (FIG. 7) configured to directly interface with substrate 12 and a second surface 86 opposite first surface 84. In one embodiment, each cling 80 is formed from a substantially transparent sheet of material including graphics 82 or other indicia reverse printed to first surface 84 such that graphics 82 are viewable from second surface 86 through cling 80. In one embodiment, one or more of clings 80 is formed of an opaque sheet of electrostatically charged material including graphics 82 printed on second surface 86.

In one embodiment, clings 80 are provided in groups 88 that collectively define a costume, other outfit or theme of clings. Groups 88 of clings 80 are configured to be applied to subject portion 16 to dress or otherwise decorate subject portion 16 in a particular overall costume or theme. For example, as illustrated in FIG. 5, a group 88 of clings 80 is provided to collectively define a monster costume, for example, a monster costume associated with the Halloween holiday. More particularly, as illustrated in FIG. 5, group 88 of clings 80 includes a mask **80*a*, pants 80*b*, and shoes 80*c* and 80*d* all providing part of a costume associated with a single monster. As such, clings 80 may each represent a costume member or item (e.g., an item of clothing, a mask, a wig, an additional appendage or other item) such that two or more clings 80 collectively define a costume as a whole for subject portion 16. Clings 80 are sized and shaped to fit on subject portion 16** to define portions of costume in a manner that will be apparent to those of skill in the art upon reading this application.

Additionally referring to FIG. 6, in one example, some clings 80, for example, shoes **80*c* and 80*d*, are sized to follow or to be coextensive with a portion of an outer perimeter 70 of subject portion 16. In one embodiment, one or more clings 80, for example, mask 80*a* is configured to be coextensive with a portion of subject portion 16 and to also extend to and beyond outer perimeter 70 of subject portion as illustrated in FIG. 6. In one example, one or more clings 80 includes one or more cutouts 90 for revealing an area of subject portion 16 therethrough (e.g., eyes or mouth of subjection portion 16**).

As shown in FIG. 5, in one embodiment, group 88 of clings 80 are provided on a piece of backing paper or other sheet 100 with a coating or finish on a cling side 102 thereof such that cling side 102 is configured to selectively and readily removably receive group 88 of clings 80. For example, varnish 104 or other release liner may be applied to cling side 102 of sheet 100 to releasably receive clings 80. As such, clings 80 can be stored on sheet 100 prior to and after use on substrate 12. In one embodiment, each group 88 of clings 80 is formed on a different sheet 100.

Figure 8:
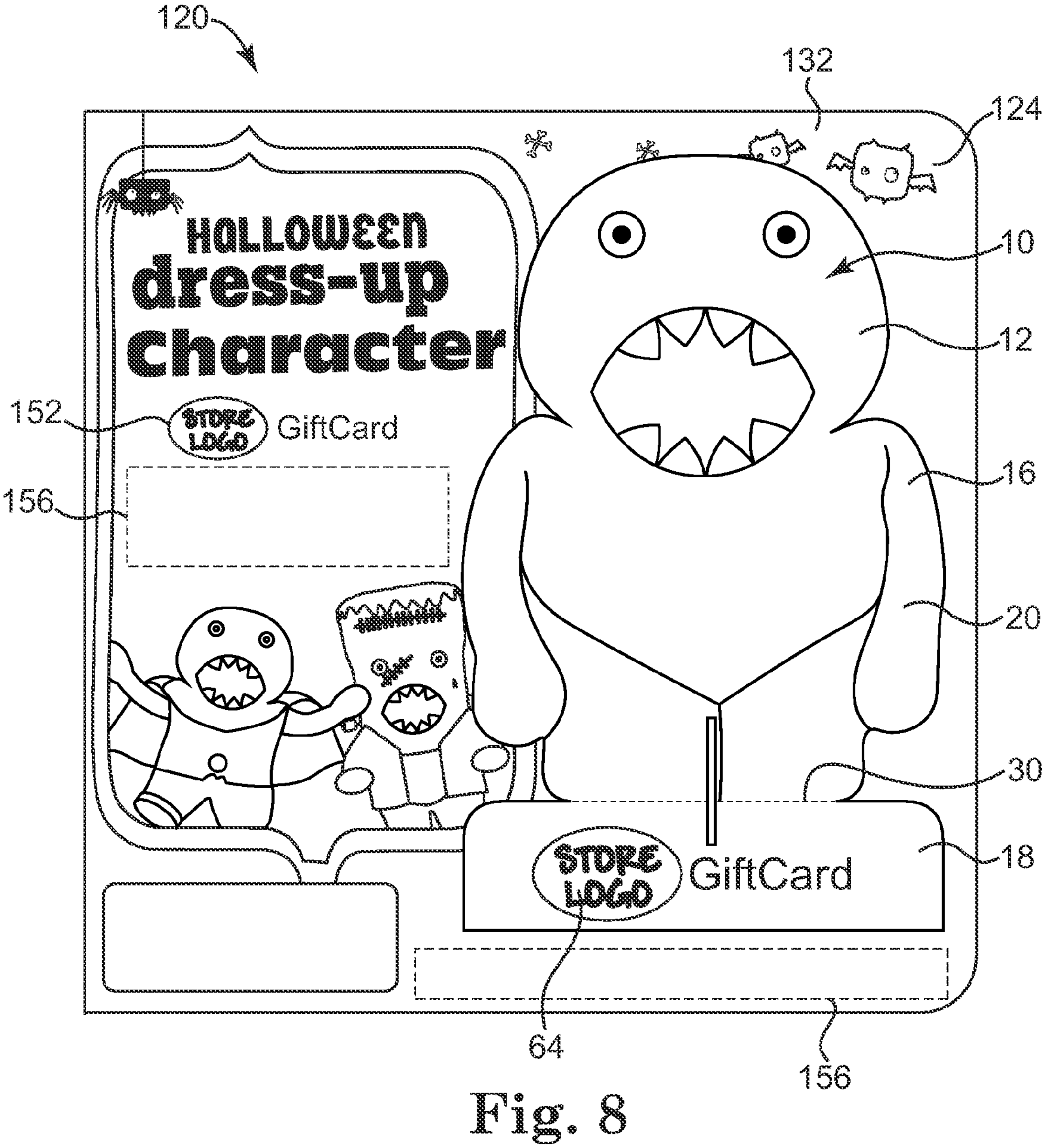
FIG. 8 is a front view illustration of a transaction card assembly including the transaction card of FIG. 1 and a folded backer, according to one embodiment of the present invention.
Figure 9:
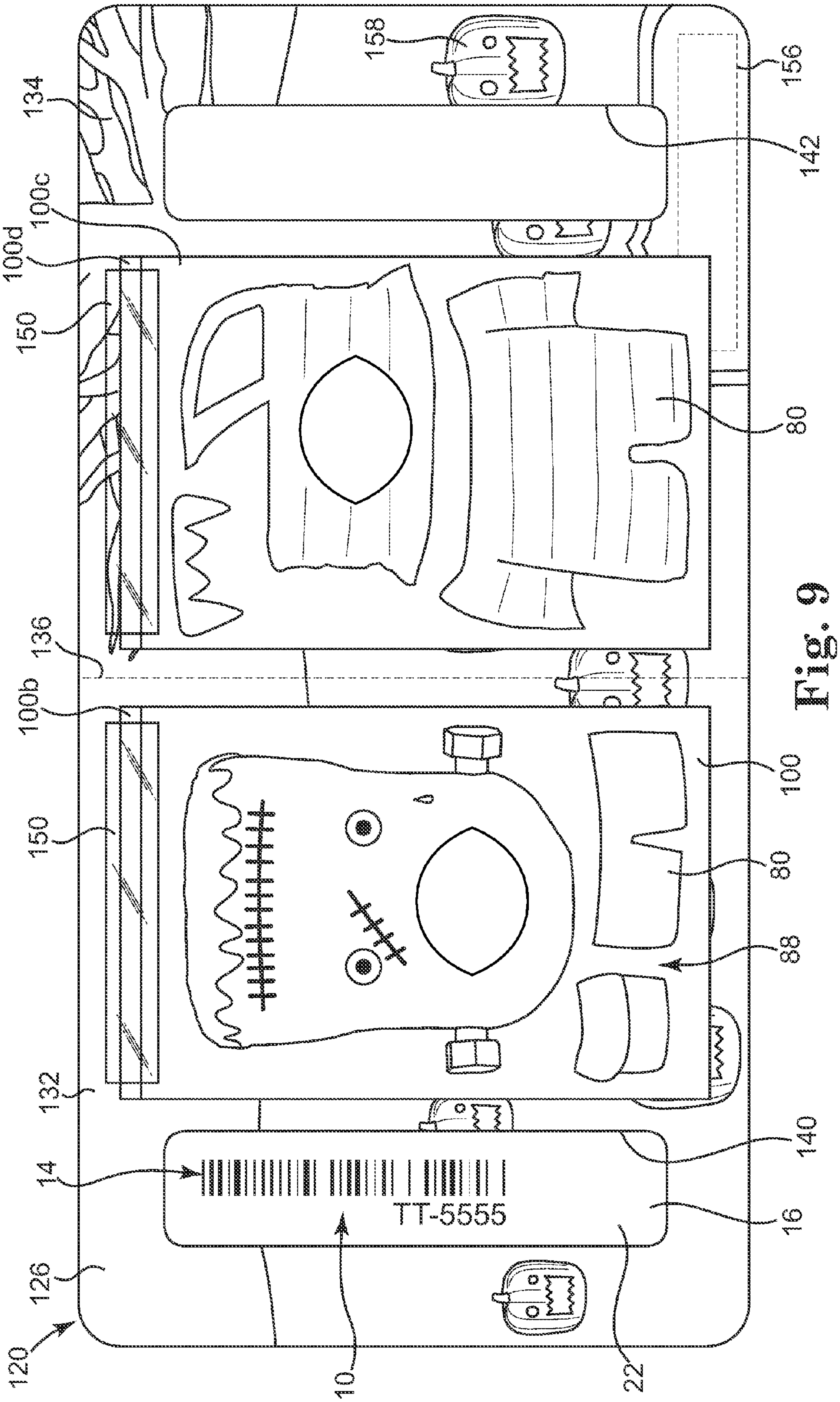
FIG. 9 is a front view illustration of the transaction card assembly of FIG. 8 when the backer is unfolded to reveal statically charged clings, according to one embodiment of the present invention.
Figure 10:
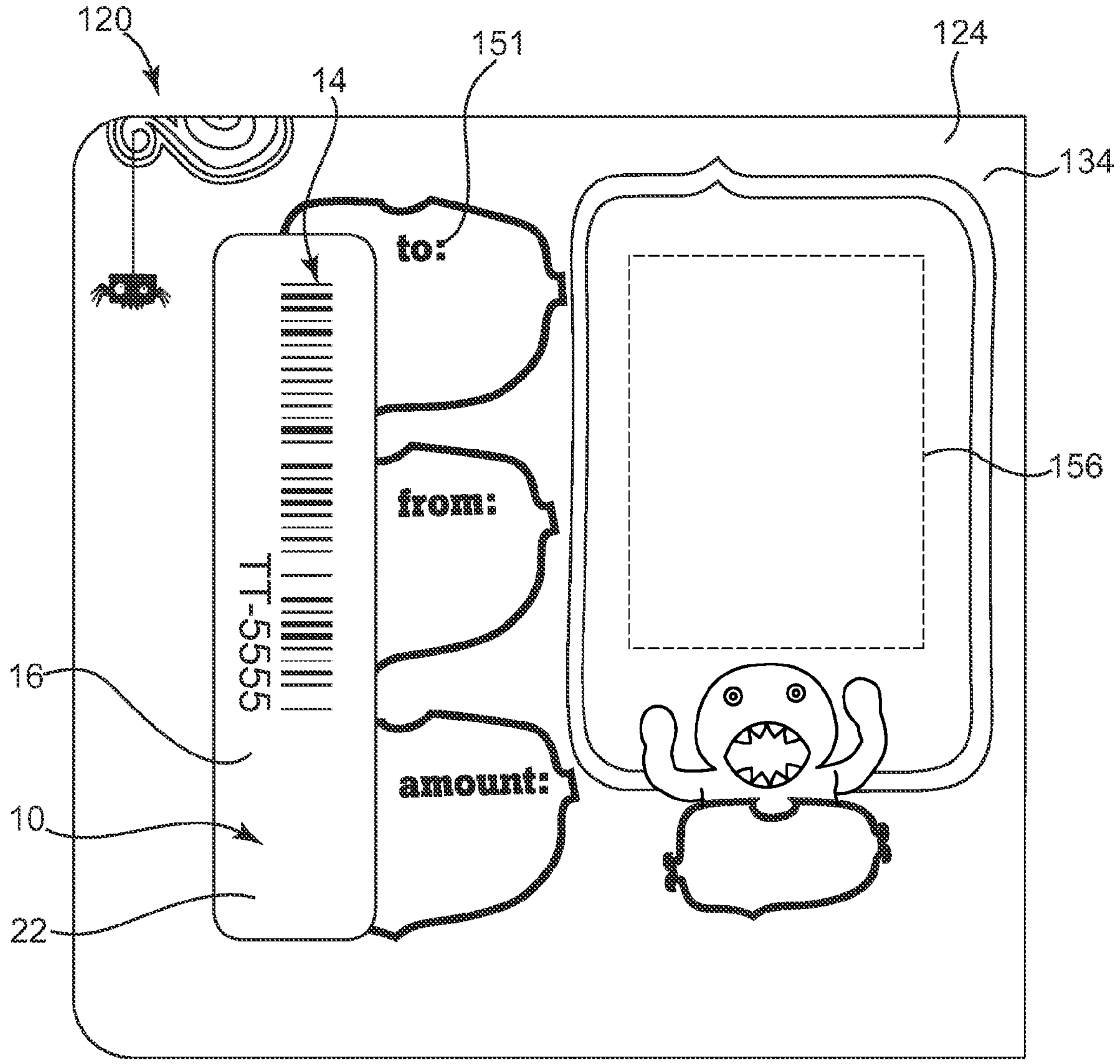
FIG. 10 is a rear view illustration of the transaction card assembly of FIG. 8 when the backer is folded, according to one embodiment of the present invention.

FIGS. 8-10 illustrate a transaction card assembly 120 including transaction card 10, clings 80 and a carrier or backer 122 configured to be selectively coupled with and to support transaction card 10 and clings 80. Accordingly, backer 122 is one example of means for supporting transaction card 10 and for substantially enclosing clings 80 on sheets 100, **100*b*, 100*c* and 100*d*. FIGS. 8, 9 and 10 respectively depict a front closed view, a front open view and a rear closed view of backer 122 and the remainder of transaction card assembly 120. Transaction card 10 is readily releasably attached to backer 122, for example by removable adhesive, overlying skinning material, or the like. Backer 122 comprises a single layer or multiple layers of paper or plastic material, for example, generally in the form of a relatively stiff but bendable/flexible card such that backer 122 defines a first or outside surface 124 and a second or inside surface 126 opposite first surface 124**. Use of other materials is also contemplated.

In one example, backer 122 is a bi-fold backer defining first panel 132 and second panel 134 separated from one another by fold line 136. In one embodiment, transaction card 10 is adhered, blister sealed or otherwise readily removably coupled with first surface 124 and first panel 132. More particularly, in one example, backer 122 includes a first window or opening 140 and a second window or opening 142 for displaying account identifier 14 of transaction card 10 therethrough as illustrated in FIG. 10. First opening 140 and second opening 142 are each examples of means for visually permitting access to account identifier 14.

In one embodiment, first opening 140 is formed in first panel 132 and second opening 142 is formed in second panel 134. First opening 140 and second opening 142 are similarly sized and shaped and positioned on opposite sides of fold line 136. As such, when backer 122 is folded along fold line 136 into a closed position as shown in FIGS. 8 and 10, first opening 140 and second opening 142 align to reveal account identifier 14 of transaction card 10 through both first opening 140 and second opening 142.

As previously described, account identifier 14 is adapted for accessing an account or a record associated with transaction card 10 for activating, loading value to or debiting value from the account or record. Accordingly, first opening 140 and second opening 142 collectively allow viewing or other access to account identifier 14 to activate and/or load transaction card 10 without removing transaction card 10 from backer 122. In one embodiment, a portion of backer 122 alternatively is configured to be folded away from the remainder of backer 122 to access account identifier 14 or account identifier 14 is otherwise accessible through backer 122.

Backer 122, as illustrated in FIG. 9, additionally supports clings 80, for example, clings 80 releasably supported on one or more sheets. For instance, in one embodiment, transaction card assembly 120 includes a plurality of sheets 100, 100*b*, 100*c* and 100*d* each supporting a different group 88 of clings 80. In one example, each group 88 of clings 80 relates to a different costume, outfit or decorated theme for subject portion 16. In one embodiment, each sheet 100, 100*b*, 100*c* and 100*d* is attached to second surface 126 with a piece of tape 150, adhesive or other suitable attachment device. In one example, the plurality of sheets 100, 100*b*, 100*c* and 100*d* is attached to second surface 126 such that one or more sheet 100, 100*b*, 100*c* and/or 100*d* can be flipped or rotated relative to backer 122 in a book or tablet like format as will be apparent to those of skill in the art upon reading the present application.

Backer 122 displays indicia, graphics or text information including store logo(s), store name(s), slogans, advertising, instructions, directions, brand indicia, promotional information, holiday indicia, seasonal indicia, media format identifiers, characters and/or other information. For example, indicia 151 include to, from, amount and/or message fields. The fields of indicia 151 provide areas of backer 122 configured to be written upon by a consumer to personalize backer 122 for presentation as a gift to a particular recipient, for a particular purpose and/or to indicate a value of transaction card 10. In one embodiment, transaction card 10 includes brand indicia 152, which identify a store, brand, department, etc. and/or services associated with transaction card 10. Brand indicia 152 may be similar to or otherwise visually correspond with brand identifier 64 on transaction card 10.

Referring to FIG. 9, in one embodiment, backer 122 includes indicia 154 indicating that transaction card 10 is redeemable for the purchase of goods and/or services and that upon use, a value of the purchased goods and/or services will be deducted from the financial account or record linked to transaction card 10. In one embodiment, indicia 154 include phrases such as "<NAME OF STORE> GiftCard" and "This GiftCard is redeemable for merchandise or services at any of our stores or at our web site," and/or provides help or phone line information in case of a lost, stolen or damaged transaction card 10, etc.

In one example, instructional indicia 156 inform a bearer of transaction card assembly 120 that transaction card 10 includes clings 80 that can be selectively applied, removed and reapplied to subject portion 16 to dress or otherwise decorate subject portion 16. In one embodiment, instructional indicia 156 additionally or alternatively inform a user that stand portion 18 can be readily separated from subject portion 16, rotated and re-coupled with subject portion 16 to form a subject that can stand on separate support surface 52. As such, instructional indicia 156 further promote the sale of transaction card 10 by drawing the attention of a potential consumer to the non-transactional features of transaction card 10. Instructional indicia 156 may additionally or alternatively instruct bearer of transaction card assembly 120 of any other features or available items associated with transaction card assembly 120. For example, instructional indicia 156 may inform card assembly bearer that films featuring the subject depicted by subject portion 16 and/or additional music, scenes, costumes, outfits, themes, etc. that are associated with the depicted subject are available at a stated web address, etc.

Per one embodiment, backer 122 includes scene indicia 158 depicting a scene or background for non-transactional use with subject portion 16 when subject portion 16 is configured to stand on support surface 52. For example, scene indicia 158 may be provided on second surface 126 of backer 122 such that backer 122 can stand on support surface 52 when backer 122 is partially folded about fold line 136. As such, subject portion 16 and stand portion 18 can be positioned on support surface 52 in front of scene indicia 158 on backer 122 providing a synergistic play set.

Any of identifiers or indicia 26, 60, 64, 151, 152, 154, 156 and 158 or other indicia optionally may appear anywhere on backer 122 or transaction card 10. Additional information besides that specifically described and illustrated herein may also be included and/or one or more of identifiers or indicia 26, 60, 64, 151, 152, 154, 156 and 158 may be eliminated.

Figure 11:
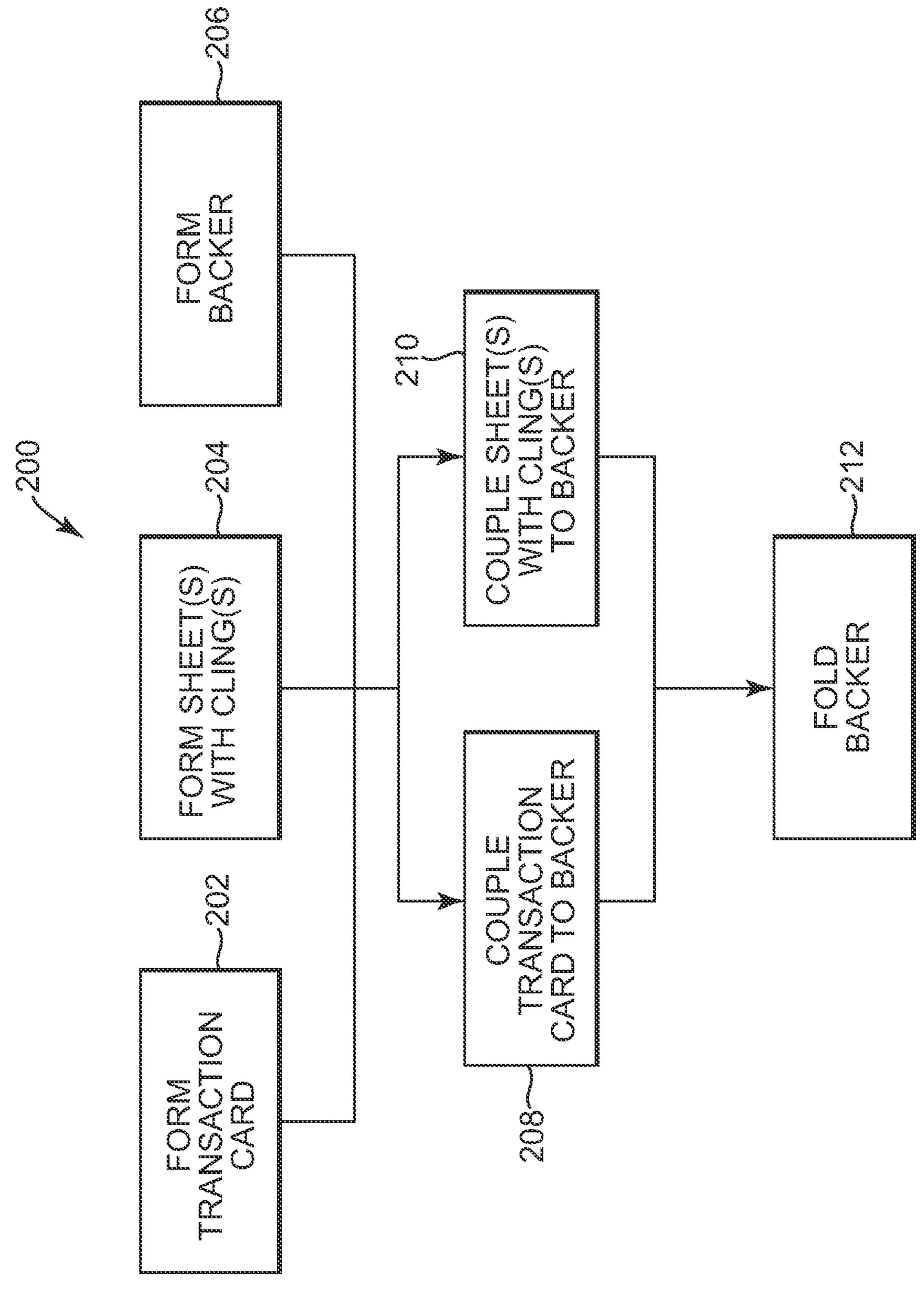
FIG. 11 is a flow chart illustrating a method of forming a transaction product, according to one embodiment of the present invention.

One embodiment of a method of forming transaction card assembly 120 is generally indicated at 200 in FIG. 11 and is described with additional reference to FIGS. 1, 2, 5 and 8-10. At 202, transaction card 10 is formed. More specifically, substrate 12 is provided and indicia such as one or more of identifiers or indicia 26, 60 and 64 and/or other indicia are printed on substrate 12. In one embodiment, printing to substrate 12 includes printing at least a portion of account identifier 14 to first surface 20 and/or second surface 22, for example, where account identifier 14 includes a bar code and/or number or character sequence. In one example, account identifier 14 is embedded within or otherwise provided as part of substrate 12 prior to operation 202.

In one embodiment, forming transaction card 10 at 202 additionally includes cutting outermost perimeter 42 of substrate 12 such as from a larger sheet of material (not shown) and scoring, cutting or otherwise defining line of weakness 30 between subject portion 16 and stand portion 18. In one embodiment, subject portion 16 and stand portion 18 are separated by a single line of weakness 30 and each abut that line of weakness 30. The single line of weakness 30 simplifies manufacturing by limiting the number of lines of weakness that need to be created in transaction card 10.

Slots 32 and 34 are also cut from or otherwise formed in substrate 12, for example, in positions as described above. In one example, slots 32 and 34 are laterally aligned with one another on opposite sides of the line of weakness to define larger slot 40. By so aligning slots 32 and 34, which have similar widths, manufacturing is simplified as a single punch or series of cuts can be used to form both slots 32 and 34. Transaction card 10 may be printed and subsequently cut (or otherwise extruded, etc. to form outermost perimeter 42, etc.) or vice versa as will be apparent to one of skill in the art upon reading the present application.

At 204, one or more sheets 100 each having one or more clings 80 thereon are formed. Clings 80 are cut from the base material such as polyvinyl chloride (PVC) and are electrostatically charged as will be apparent to one of skill in the art upon reading the present application. In one embodiment, clings 80 are printed with graphics 82 prior to being cut and/or electrostatically charged. Each cling 80 is supported by one of respective sheets 100, **100*b*, 100*c* and 100*d* for selectively supporting clings 80, such as separate groups 88 of clings 80 as described above. In one embodiment, each sheet 100, 100*b*, 100*c* and 100*d* includes a different group 88 of clings 80**.

More specifically, in one embodiment, clings 80 are formed of PVC mixed with plasticizers to form a thermoplastic compound. The compound is calendered to a desired thickness (e.g., about 0.15 mm) and smoothness. Subsequently, the compound is chilled to maintain the desired thickness. The calendered PVC material (i.e., the cling material) is laminated to sheets 100, **100*b*, 100*c* and 100*d* formed of label paper with a release lining thereon. In particular, first surface 84 of PVC material is laminated to one of sheets 100, 100*b*, 100*c* and 100*d***. The calendered PVC sheet generally is statically charged.

In one example, ionized air blowers or ionized air curtains force ionized particles into the PVC material to de-static the non-laminated side of the PVC material (i.e., second surface 86 of the resultant cling 80) so that it can more readily be printed with graphics 60 and/or brand identifier 64. In one embodiment, the PVC material is treated to remove static from the non-laminated side after lamination with one of sheets 100, **100*b*, 100*c* and 100*d***. Other methods to de-static the PVC material, such as with tinsel, static string or static bars to de-static the PVC material while the PVC material is processed through a press, are also contemplated and will be apparent to those of skill in the art upon reading the present application.

Following lamination of the PVC material to sheets 100, **100*b*, 100*c* and 100*d*, the PVC material is kiss cut (i.e., is cut therethrough generally without cutting the underlying sheet 100, 100*b*, 100*c* or 100*d*) to define clings 80 thereon. As such, waste PVC material may define remainder or waste portions on each sheet 100, 100*b*, 100*c* or 100*d* surrounding clings 80. In one embodiment, each sheet 100, 100*b*, 100*c* and 100*d* supports one group 88 of clings 80, and each group 88 corresponds to a single outfit, costume or other decoration for subject portion 16**. Other methods of forming clings will be apparent to those of skill in the art upon reading this application.

At 206, backer 122 is formed from suitable paper or other substantially planar material. In one embodiment, backer 122 is printed with indicia 151, 152, 154, 156 and 158 and subsequently is cut to define an outer perimeter thereof as well as first opening 140 and second opening 142. In one example, fold line 136 is predefined by a score, perforation or other suitable line.

Once each of operations 202, 204 and 206 are completed (note that operations 202, 204 and 206 may be performed substantially simultaneously or in any desired order), operations 208 and 210 are performed. At 208, transaction card 10 is coupled to backer 122. More specifically, in one embodiment, second surface 22 of transaction card 10 is coupled to first surface 124 of first panel 132 such that account identifier 14 aligns with and is visible through first opening 140 of backer 122. Transaction card 10 may be coupled to backer in any suitable manner, for example, using adhesive, skinning and/or any other suitable means or in any other suitable manner.

At 210, sheets 100, **100*b*, 100*c* and 100*d* with clings 80 coupled thereto (or any other suitable auxiliary members such as substantially planar auxiliary members) are attached to backer 122. For example, sheets 100 and 100*b* are stacked and positioned on second surface 126 of first panel 132 between fold line 136 and first opening 140. In one embodiment, sheets 100 and 100*b* are slightly staggered, such as vertically, in a manner exposing an edge of each sheet 100 and 100*b* at one side thereof (e.g., the top as illustrated in FIG. 9). A piece of tape 150 or other suitable attachment means is posited over the exposed edge of each sheet 100 and 100*b* and a portion of second surface 126 of first panel 132 to hingedly couple sheets 100 and 100*b* to backer 122. In one embodiment, sheets 100*c* and 100*d* are similarly hingedly or otherwise coupled to backer 122 on the opposite side of fold line 136 (i.e., on second surface 126 of second panel 134, e.g., between fold line 136 and second opening 142). Notably, operations 208 and 210** can be performed in either order or substantially simultaneously.

At 212, backer is folded about fold line 136 such that second surface 126 of first panel 132 is moved toward second surface 126 of second panel 134. Once folded, sheets 100, **100*b*, 100*c* and 100*d* are substantially interposed and enclosed between first panel 132 and second panel 134 of backer 122. In one embodiment, once backer 122 is folded, first opening 140 aligns with second opening 142 such that account identifier 14 of transaction card 10 is viewable through both first opening 140 and second opening 142 to facilitate machine reading of account identifier 14 for activating transaction card 10 and/or loading value thereto while transaction card 10 is coupled with backer 122. Although described as occurring after operations 208 and 210, it should be understood that, in one example, operation 212 may occur before operation 208** as will be apparent to one of skill in the art upon reading the present application.

Figure 12:
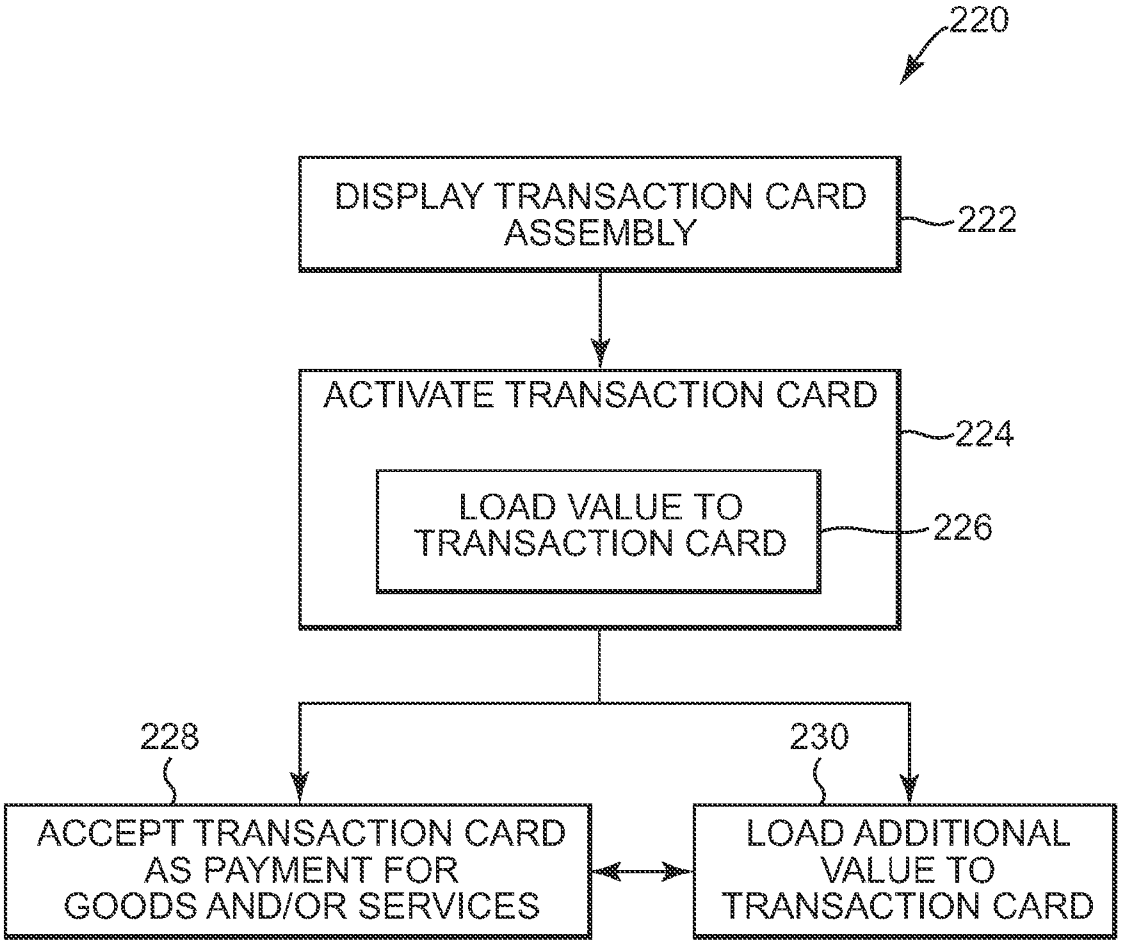
FIG. 12 is a flow chart illustrating a method of encouraging purchase and facilitating use of a transaction product, according to one embodiment the present invention.

FIG. 12 is a flow chart illustrating one embodiment of a method 220 of encouraging purchase and facilitating use of transaction card 10 by consumers and/or recipients. At 222, transaction card 10 is placed on or hung from a rack, shelf or other similar device to display transaction card 10 for sale to potential consumers. In one embodiment, a depiction of transaction card 10 is placed on a web site for viewing and purchase by potential consumers.

At 224, a consumer who has decided to purchase transaction card 10 presents transaction card 10 on backer 122 to a retail store employee, retail store kiosk, remote terminal, or other person or device to scan account identifier 14 to access an account or record linked to account identifier 14. In particular, account identifier 14 is scanned or otherwise accessed, for example through first opening 140 and second opening 142 of backer 122 to activate transaction card 10. Upon accessing the account or record, then, at 226, value is added to the account or record in the form of monetary value, points, minutes, etc. Thus, transaction card 10 is activated and loaded. In one embodiment, value is already associated with the account or record linked to account identifier 14. In such an embodiment, account identifier 14 is scanned to activate the account or record and operation 226 may be eliminated.

Once transaction card 10 is activated and loaded, transaction card 10 can be used by the consumer or any other bearer of transaction card 10 to purchase goods and/or services at the affiliated retail setting (e.g., a retail store or web site) or can be used in exchange for calling minutes, etc. In one embodiment, where transaction card 10 is displayed on a web site at 222, then, at 224, transaction card 10 may be activated in any suitable method and may not require the physical scanning of account identifier 14 to be activated or to otherwise access the associated account or record such as at 226.

In one example, at 228, the retail store or other affiliated retail setting or web site accepts transaction card 10 or at least a portion thereof including account identifier 14 (e.g., subject portion 16) as payment toward the purchase of goods and/or services made by the current bearer of transaction card 10. In particular, the value currently loaded on transaction card 10 (i.e., value stored or recorded in the account or record linked to account identifier 14) is applied toward the purchase of goods and/or services. At 230, additional value is optionally loaded on transaction card 10 at a point-of-sale terminal, kiosk, web site or other area of the retail store or related setting.

Upon accepting transaction card 10 as payment at 228, the retail store or related setting can subsequently perform either operation 228 or operation 230 as requested by a current bearer of transaction card 10. Similarly, upon loading additional value on transaction card 10 at 230, the retail store or related setting can subsequently perform either operation 230 again or operation 228. In one example, the ability to accept transaction card 10 as payment for goods and/or services is limited by whether the account or record associated with transaction card 10 has any value stored or recorded therein at the time of attempted redemption.

Figure 13:
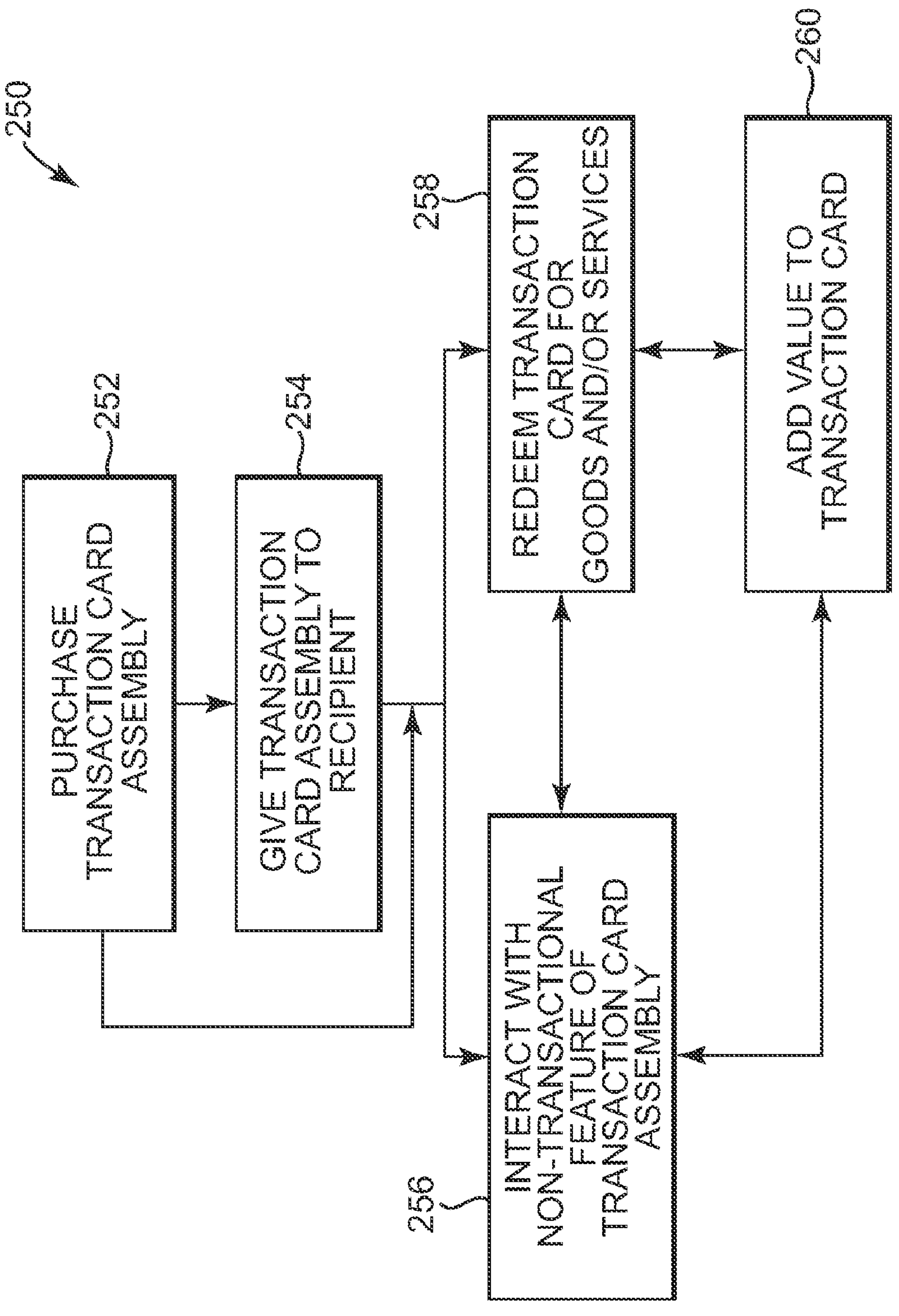
FIG. 13 is a flow chart illustrating a method of using a transaction product, according to one embodiment of the present invention.

FIG. 13 is a flow chart illustrating one embodiment of a method 250 of using transaction card 10 (e.g., FIGS. 1-10). At 252, a potential consumer of transaction card 10, which is displayed in a retail store or viewed on a web site, decides to and does purchase transaction card 10 from the retail store or web site. It should be understood that transaction card 10 can be displayed and purchased alone or as part of transaction card assembly 120 along with backer 122. Upon purchasing transaction card 10, a retail store employee, a retail store kiosk or other person or device scans account identifier 14 through opening 114 of backer 122 or otherwise reads or accesses account identifier 14 (e.g., FIG. 10). Upon accessing account identifier 14, the account or record linked to account identifier 14 is accessed and activated to load value onto transaction card 10 (i.e., load value to the account or record associated with transaction card 10). In one embodiment, such as where transaction card 10 is purchased at 252 via a web site, actual scanning or other mechanical detection of account identifier 14 may be eliminated.

At 254, the consumer optionally gives transaction card 10 to a recipient, such as a graduate, relative, friend, expectant parents, one having a recent or impending birthday, a couple having a recent or impending anniversary or other party. In one embodiment, a plurality of transaction cards 10 are purchased and given to party goers, such as at a birthday party, etc. as party favors or gifts. As an alternative, the consumer can keep transaction card 10 for his or her own use thereby eliminating operation 254.

At 256, the consumer, recipient, or other current bearer of transaction card 10 is able to play with or otherwise use transaction card 10 or at least a portion thereof for non-transactional and/or amusing purposes. More specifically, as described above, the bearer is able to remove transaction card 10 from backer 122. Transaction card 10 is then snapped or otherwise broken along line of weakness 30 without the use of tools to separate subject portion 16 and stand portion 18 into two separate pieces. Subject portion 16 and stand portion 18 are rotated with respect to one another and reassembled by mating slots 32 and 34 with one another and a thickness of subject portion 16 and stand portion 18. Upon reassembly of transaction card 10, the card bearer can use transaction card 10 as a toy, etc. alone or with backer 122, more specifically, the scene depicted by backer 122, providing additional amusement to the bearer and/or other observers of transaction card 10.

The amusing nature of transaction card 10 is further enhanced by use of clings 80. In particular, the card bearer selects desired ones of clings 80 and peels or otherwise removes each desired one of clings 80 from the respective one of sheets 100, 100*b*, 100*c* and 100*d*. The cling 80 is then placed on first surface 20 of subject portion 16. The electrostatic nature of cling 80 selectively maintains each cling 80 on subject portion 16. In one embodiment, clings 80 can be mixed and matched to form different appearances of subject portion 16. In one example, where subject portion 16 depicts a character and clings 80 depict costumes or clothing, changing which of clings 80 is positioned on subject portion 16 essentially appears as change the clothes of the character.

At 258, the product bearer redeems transaction card 10 or at least a portion thereof for goods and/or services from the retail store or web site. At 260, the bearer of transaction card 10 optionally adds value to transaction card 10, more particularly, to the account or record associated with account identifier 14 included therewith, at the retail store or over the Internet (i.e., via the web site). Upon playing with at least a portion of transaction card 10 and/or backer 122 at 256 or redeeming transaction card 10 at 258 or adding value to transaction card 10 at 260, the bearer of transaction card 10 subsequently can perform either of operations 256, 258 or 260 as desired. In one embodiment, the ability of the bearer to repeat redeeming transaction card 10 at 258 is limited by whether the account or record linked with transaction card 10 has any remaining value stored or recorded therein at the time of attempted redemption.

Although described above as occurring at a single retail store or web site, in one embodiment, purchasing transaction card 10 at 252, redeeming transaction card 10 at 258 and adding value to transaction card 10 at 260, can each be performed at any one of a number of stores adapted to accept transaction card 10 or over the Internet. In one example, a number of stores are each part of a chain or are similarly branded stores. In one example, a number of stores include at least one web site and/or at least one conventional brick and mortar store.

Stored-value cards and other transaction products come in many forms, according to embodiments of the invention. The gift card, like other stored-value cards and transaction products, can be "re-charged" or "re-loaded" at the direction of the original consumer, the gift recipient, or a third party. The term "loading on" or "loaded on" herein should be interpreted to include adding to the balance of an account or record associated with a transaction product. The balance associated with the s transaction product declines as the transaction product is used, encouraging repeat visits or use. The transaction product remains in the user's purse or wallet, serving as an advertisement or a reminder to revisit the associated merchant. Transaction products according to embodiments of the invention provide a number of advantages to both the consumer and the merchant. Other transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A transaction card comprising:

a subject portion defining a first slot;

a stand portion coupled to the subject portion along a line of weakness and readily separable from the subject portion along the line of weakness without using tools, wherein the stand portion defines a second slot having a similar width as the first slot; and an account identifier fixedly connected to one of the subject portion and the stand portion, the account identifier linking the one of the subject portion and the stand portion to at least one of an account and a record, wherein the account identifier is machine readable by a point-of-sale terminal;

wherein when the subject portion and the stand portion are separated from one another along the line of weakness, the subject portion and the stand portion are configured to be reassembled by turning one of the subject portion and the stand portion substantially 90° with respect to the other of the of the subject portion and the stand portion and sliding the subject portion and the stand portion toward one another such that the first slot receives a thickness of the stand portion and the second slot receives a thickness of the subject portion.

2. The transaction card of claim 1, wherein the account identifier is a bar code.

3. The transaction card of claim 1, wherein the account identifier includes at least one of a bar code, a magnetic strip, a smart chip, and a radio frequency identification (RFID) device.

4. The transaction card of claim 1, wherein the subject portion and the stand portion each directly abut an opposite side of the line of weakness.

5. The transaction card of claim 4, wherein the first slot extends from the line of weakness in a first direction, and the second slot extends from the line of weakness in a second direction.

6. The transaction card of claim 5, wherein the first slot and the second slot laterally align with one another along the line of weakness.

7. The transaction card of claim 1, wherein the line of weakness is the only line of weakness between the subject portion and the stand portion.

8. The transaction card of claim 1, wherein the stand portion and the support portion are formed of a single piece of material.

9. The transaction card of claim 1, in combination with a backer and a plurality of clings, wherein the plurality of clings and the transaction card are supported by the backer, and each of the clings is releasably couplable to the subject portion.

10. The combination of claim 9, wherein the subject portion depicts a character, and each of the clings depicts a costume item such that placing various ones of the clings on the subject portion changes an overall costume of the character.

11. The combination of claim 9, wherein the backer is a bi-fold backer defining a first panel with a first window, and a second panel with a second window, the first panel being separated from the first panel by a fold line, and wherein when the bi-fold backer is folded along the fold line, the plurality of clings are substantially enclosed within the backer and the first window aligns with the second window.

12. The combination of claim 11, wherein the transaction card is coupled on an outside of the backer such that when the backer is folded, the account identifier is visible through both of the first window and the second window.

13. The combination of claim 9, wherein the clings are electrostatically charged vinyl clings.

14. The combination of claim 9, wherein the clings are provided and initially supported on a sheet having a releasable liner adjacent the clings.

15. A stored-value card assembly comprising:

a stored-value card including means for linking the stored-value card with at least one of an account and a record having a value associated therewith such that at least a portion of the stored-value card can be used as payment toward a purchase of one or more of goods and services;

one or more auxiliary member; and means for supporting the stored-value card and for substantially enclosing the one or more auxiliary member, wherein the means for supporting includes two means for visually permitting access to the means for linking positioned such that when the means for supporting encloses the one or more auxiliary member, the two means for visually permitting access align with one another such that the means for linking is viewable through both of the two means for visually permitting access.

16. The stored-value card assembly of claim 15, wherein the stored-value card is positioned on an external surface of the means for supporting while the one or more auxiliary member is positioned on an internal surface of the means for supporting.

17. The stored-value card assembly of claim 15, wherein the means for supporting is bi-fold.

18. The stored-value card assembly of claim 15, wherein the stored-value card includes a first piece and a second piece initially attached to one another and means for separating the first piece from the second piece without the use of tools.

19. The stored-value card assembly of claim 16, wherein the first piece depicts a subject and the second piece includes means for receiving the first piece and facilitating support of the first piece from a support surface such that the first piece extends upwardly from the first surface when the stored-value card is placed on the first surface.

20. The stored-value card assembly of claim 19, wherein the means for linking is fixedly connected to one of the first piece and the second piece.

21. A method of providing and facilitating use of a transaction product, the method comprising:

displaying a transaction card assembly including:

displaying a transaction card defining a character and including an account access feature linking the transaction card to a financial account configured to store funds for subsequent use toward the purchased of one or more of goods and services, and providing at least one costume member sized and shaped to fit substantially on and readily releasably adhere to a surface of the transaction card in a manner appearing as a costume item for the character; and activating the financial account linked to the transaction card while the transaction card is coupled with the backer to permit subsequent deductions from a value associated with the financial account for application toward one of a purchase and a use of one or more of goods and services at a point-of-sale.

22. The method of claim 21, wherein the backer includes two windows positioned opposite a fold line, the backer being folded about the fold line to substantially enclose the at least one statically charged outfit and to align the two windows with one another, and displaying the transaction card includes providing the transaction card positioned on the backer such that the account identifier of the transaction card is viewable through both of the two windows.

23. The method of claim 21, wherein the transaction card includes a first portion and a second portion separated by a line of weakness, the first portion defining a first elongated slot extending in a first direction from the line of weakness into an interior of the first portion, the second portion defining a second elongated slot extending in a second direction from the line of weakness into an interior of the second portion, wherein the first elongated slot and the second elongated slot are positioned directly adjacent one another on opposite sides of the line of weakness, the first portion defines the character, and the account access feature is included on one of the first portion and the second portion.

24. The method of claim 21, wherein displaying the transaction card assembly includes displaying a backer coupled with the transaction card and substantially enclosing the at least one costume member, wherein the transaction card is positioned on an external surface of the backer.

25. The method of claim 21, wherein the at least one costume member is electrostatically charged to readily releasably adhere to the transaction card.

26. A stored-value card assembly comprising:

a stored-value card including:

a subject portion defining a first elongated slot and depicting a character, a stand portion coupled to the subject portion along a line of weakness and readily separable from the subject portion along the line of weakness without using tools, wherein the stand portion defines a second elongated slot having a similar width as the first elongated slot, the first elongated slot extending in a first direction from the line of weakness into an interior of the subject portion, the second elongated slot extending in a second direction from the line of weakness into an interior of the stand portion, wherein the first elongated slot and the second elongated slot are positioned directly adjacent one another on opposite sides of the line of weakness, and an account identifier linking the stored-value card with at least one of an account and a record having a value associated therewith such that at least a portion of the stored-value card can be used as payment toward a purchase of one or more of goods and services;

one or more auxiliary member including at least one electrostatically charged outfit sized and shaped to fit on and releasably adhere to a surface of the subject portion in a manner appearing as a clothing item for the character; and a backer coupled with and supporting the stored-value card and substantially enclosing the one or more auxiliary member, wherein the stored-value card is positioned on an external surface of the backer, the backer includes two windows permitting access to the account identifier positioned such that when the backer encloses the one or more auxiliary member, the two windows align with one another such that the account identifier is viewable through both of the two windows.

* * * * *